United States Patent
Ikeno et al.

(10) Patent No.: US 7,078,460 B2
(45) Date of Patent: Jul. 18, 2006

(54) ROOM TEMPERATURE CURABLE ORGANOPOLYSILOXANE COMPOSITION FOR MOLDING

(75) Inventors: Masayuki Ikeno, Maebashi (JP); Morio Ohashi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 225 days.

(21) Appl. No.: 10/612,935

(22) Filed: Jul. 7, 2003

(65) Prior Publication Data

US 2004/0010109 A1 Jan. 15, 2004

Related U.S. Application Data

(63) Continuation-in-part of application No. 10/044,983, filed on Jan. 15, 2002, now abandoned.

(30) Foreign Application Priority Data

Jan. 15, 2001 (JP) ............................ 2001-007078

(51) Int. Cl.
C08L 83/04 (2006.01)
C08K 5/36 (2006.01)

(52) U.S. Cl. ................ 524/588; 524/82; 524/392; 528/12; 528/25; 528/33; 528/34; 528/901

(58) Field of Classification Search ............. 524/82, 524/588; 528/12, 25, 33, 34, 901
See application file for complete search history.

(56) References Cited

U.S. PATENT DOCUMENTS

| | | | | |
|---|---|---|---|---|
| 3,318,763 | A | * | 5/1967 | Brooks et al. ............. 514/483 |
| 4,201,698 | A | * | 5/1980 | Itoh et al. ................ 524/83 |
| 4,485,206 | A | * | 11/1984 | Inoue et al. .............. 524/719 |
| 4,529,749 | A | * | 7/1985 | Favre et al. .............. 523/122 |
| 4,797,448 | A | * | 1/1989 | Liang ..................... 525/106 |
| 4,906,719 | A | | 3/1990 | Chu et al. |
| 4,973,644 | A | | 11/1990 | Onishi et al. |
| 5,204,437 | A | | 4/1993 | Ikeno et al. |
| 5,268,433 | A | | 12/1993 | Ikeno et al. |
| 5,276,087 | A | | 1/1994 | Fujiki et al. |
| 5,279,890 | A | | 1/1994 | Ikeno et al. |
| 5,292,848 | A | | 3/1994 | Ikeno et al. |
| 5,306,797 | A | | 4/1994 | Ikeno |
| 5,326,816 | A | | 7/1994 | Kinami et al. |
| 5,334,687 | A | | 8/1994 | Ikeno |
| 5,352,724 | A | | 10/1994 | Fujiki et al. |
| 5,391,674 | A | | 2/1995 | Hara et al. |
| 5,432,280 | A | | 7/1995 | Hara et al. |
| 5,484,829 | A | | 1/1996 | Gillis |
| 5,571,853 | A | | 11/1996 | Ikeno et al. |
| 5,631,320 | A | | 5/1997 | Kamohara et al. |
| 5,814,695 | A | | 9/1998 | Fitzgerald et al. |
| 5,945,466 | A | | 8/1999 | Ikeno et al. |
| 6,022,904 | A | | 2/2000 | Sollradi et al. |
| 6,172,150 | B1 | | 1/2001 | Kollmann et al. |
| 6,455,617 | B1 | | 9/2002 | Gay et al. |

FOREIGN PATENT DOCUMENTS

| | | |
|---|---|---|
| JP | 58-67753 | 4/1983 |
| JP | 59-80463 | 5/1984 |
| JP | 2-189364 | 7/1990 |
| JP | 4-253769 | 9/1992 |
| JP | 9-217009 | 8/1997 |

OTHER PUBLICATIONS

Derwent Abstract of JP-04-253769, Sep. 1992.*
English Translation of JP-04-253769, Kawate et al. Sep. 1992.*
U.S. Appl. No. 10/635,569, filed Aug. 7, 2003, Ikeno et al.
U.S. Appl. No. 10/612,935, filed Jul. 7, 2003, Ikeno et al.

* cited by examiner

*Primary Examiner*—Jeffrey B. Robertson
(74) *Attorney, Agent, or Firm*—Oblon, Spivak, McClelland, Maier & Neustadt, P.C.

(57) ABSTRACT

A room temperature curable organopolysiloxane composition is provided which includes an organopolysiloxane, a curing agent, and a specific organic compound incorporating at least one sulfur atom within each molecule. By producing a molding matrix with this type of composition, unsatisfactory curing of an unsaturated polyester resin is unlikely to occur at the contact surface with the silicone rubber of the matrix, and furthermore the mold releasability of the matrix relative to unsaturated polyester resins is excellent. As a result, the matrix can be used repeatedly for a significant number of molding operations.

12 Claims, No Drawings

ROOM TEMPERATURE CURABLE ORGANOPOLYSILOXANE COMPOSITION FOR MOLDING

This application is a continuation-in-part application of Ser. No. 10/044,983, filed Jan. 15, 2002, now abandoned, the disclosure of which is incorporated by reference.

BACKGROUND OF THE INVENTION

1. Field of the Invention

The present invention relates to a room temperature curable organopolysiloxane composition for molding purposes, which is used for producing a molding matrix, and which upon curing displays superior mold releasability, particularly relative to unsaturated polyester resins.

2. Description of the Related Art

The production from a master mold of a silicone rubber matrix comprising an organopolysiloxane composition, and the subsequent injection of a material such as a urethane resin, an epoxy resin, a dicyclopentadiene resin or a polyester resin into this matrix to form a resin molded replica product is a well-known technique. In recent years, resin molded products produced in this manner have been supplied for use in automobile components and household electrical components, and the characteristics of such resin molded products are being given serious consideration. As a result, the improvements in the characteristics of the casting resins have been quite dramatic. Unfortunately these improvements have resulted in a deterioration in the durability of the silicone rubber matrix, and the number of replica products that can be produced from a single matrix has decreased. Consequently, improvements in the durability of good mold releasability (hereinafter, referred to as mold release durability) of the silicone rubber matrix with respect to these resins have been keenly sought in order to improve the durability of the silicone rubber matrix and to increase the number of replica products.

It has been disclosed in Japanese Laid-open publication (kokai) No. 9-217009 (JP9-217009A) corresponding to U.S. Pat. No. 6,172,150 that sterically hindered phenols, aromatic amines, and zinc dithiophosphates display superior mold release durability relative to unsaturated polyester resins. Furthermore, a technique for improving polyester mold durability using a radical scavenger is disclosed in Japanese Laid-open publication (kokai) No. 10-279805 (JP10-279805A) corresponding to U.S. Pat. No. 5,814,695. However, these techniques suffer from a problem of unsatisfactory curing of the unsaturated polyester resin at the contact surface with the silicone rubber.

SUMMARY OF THE INVENTION

An object of the present invention is to provide a room temperature curable organopolysiloxane composition for molding purposes which displays superior mold releasability relative to unsaturated polyester resins, and which is unlikely to suffer problems of unsatisfactory curing of an unsaturated polyester resin at the contact surface with the silicone rubber.

The inventors of the present invention discovered that by adding an organic compound incorporating at least one sulfur atom within the molecule, an organopolysiloxane composition could be produced which conformed to the above object, and as a result were able to complete the present invention.

In other words, the present invention provides a room temperature curable organopolysiloxane composition for molding purposes comprising an organopolysiloxane, a curing agent, and an organic compound incorporating at least one sulfur atom within a single molecule (but excluding sterically hindered thiobisphenols, substituted zinc dithiophosphates, sulfides represented by the formula: $R-S_q-R'$ wherein R and R' are each a monovalent hydrocarbon group with at least three carbon atoms having or not having an ester bond or R and R' together form a ring and q is an integer of 1 to 3, compounds containing a sulfide structure represented by the formula: $R-S_q-R''$ wherein R and q are as defined above, and R'' is a bivalent hydrocarbon group having at least three carbon atoms and having or not having an ester bond, or R and R'' together form a ring, said R'' being connected to a quaternary carbon atom, and silicone polysulfides represented by a structural formula $S_a-(R^1-Si(OR^2)_3)_2$ wherein $R^1$ represents a bivalent hydrocarbon group of 2 to 8 carbon atoms, each $R^2$ represents a monovalent hydrocarbon group of 1 to 40 carbon atoms, and a represents an integer from 2 to 7).

By producing a molding matrix of a room temperature curable organopolysiloxane composition of the present invention, unsatisfactory curing of an unsaturated polyester resin is unlikely to occur at the contact surface with the silicone rubber of the matrix, and furthermore the mold releasability of the matrix relative to unsaturated polyester resins is excellent. A matrix produced using a room temperature curable organopolysiloxane composition for molding purposes according to the present invention is suitable not only for use with unsaturated polyester resin, and can also be suitably applied to a molding matrix for use with other curable resins such as urethane resins, epoxy resins and dicyclopentadiene resins, and other casting resin materials such as thermoplastic resins.

DETAILED DESCRIPTION OF THE PREFERRED EMBODIMENTS

As follows is a more detailed description of the present invention.

A room temperature curable organopolysiloxane composition for molding purposes according to the present invention comprises an organic compound incorporating at least one sulfur atom within a single molecule, such as the compounds described below.

A preferred room temperature curable organopolysiloxane composition for molding purposes according to the present invention comprises an organosilane or polyorganosiloxane with at least three hydrolyzable groups as the aforementioned curing agent, and a curing catalyst. A more specific example of a preferred composition comprises:

(a) 100 parts by weight of an organopolysiloxane represented by a general formula (1):

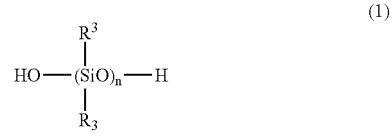

(1)

wherein, the $R^3$ groups may be the same or different, and represent an unsubstituted or substituted monovalent hydrocarbon group, and n represents an integer of at least 2, (b) 0.5 to 20 parts by weight of a compound selected from the group consisting of organosilanes contain at least three hydrolyzable groups bonded to silicon atoms within a single molecule, and organosiloxanes contain at least three hydrolyzable groups bonded to silicon atoms within a single molecule, (c) 0.1 to 20 parts by weight of an organic compound incorporating at least one sulfur atom in a single molecule, and (d) an effective quantity of a curing catalyst.

As follows is a description of each of the constituents (a) to (d).

[Constituent (a)]

In the present invention, the constituent (a) is an organopolysiloxane in which both terminals of the molecular chain are terminated with a hydroxyl group, represented by the general formula (1) shown below,

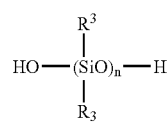

(1)

wherein, the $R^3$ groups may be the same or different, and represent an unsubstituted or substituted monovalent hydrocarbon group, and n represents an integer of at least 2, and either a single organopolysiloxane, or a combination of two or more different such organopolysiloxanes may be used.

In the general formula (1), suitable examples for the unsubstituted or substituted monovalent hydrocarbon groups represented by the symbol $R^3$, which may be different or the same, include alkyl groups such as methyl groups, ethyl groups, propyl groups, butyl groups, pentyl groups or hexyl groups; alkenyl groups such as vinyl groups, allyl groups, butenyl groups, pentenyl groups, hexenyl groups or heptenyl groups; cycloalkyl groups such as cyclopentyl groups or cyclohexyl groups; aryl groups such as phenyl groups, tolyl groups, xylyl groups or naphthyl groups; aralkyl groups such as benzyl groups or phenethyl groups; and halogen substituted alkyl groups such as 3,3,3-trifluoropropyl groups or 3-chloropropyl groups, although in terms of ease of synthesis, methyl groups are preferable.

Furthermore, a part of these monovalent hydrocarbon groups represented by R3 may also be substituted with a hydroxyl group, particularly in those cases where the desired characteristics require such a substitution.

Furthermore in the general formula (1) described above, n represents an integer of at least 2, and should preferably represent an integer with an average value of 100 to 1000, and an organopolysiloxane with a value of n within this range should preferably display a viscosity at 25° C. within a range from 0.2 to 100 Pa·s.

[Constituent (b)]

In the present invention, the constituent (b) is an organosilane and/or an organosiloxane, contain at least three hydrolyzable groups bonded to silicon atoms within each single molecule. There are no particular restrictions on the molecular structure of the organosiloxane, and straight chain organodisiloxanes are suitable, as are organopolysiloxanes with either branching or three dimensional network structures.

This constituent acts as a cross-linking agent, and as a result it is necessary that there be at least three hydrolyzable groups bonded to silicon atoms within each molecule. In other words, these hydrolyzable groups react with the hydroxyl groups bonded to silicon atoms within the organopolysiloxane of the constituent (a) (namely, the silanol groups), and form a cured three dimensional structure with elastomer characteristics.

Examples of suitable hydrolyzable groups include alkoxy groups such as methoxy groups, ethoxy groups, propoxy groups, butoxy groups and methoxyethoxy groups; acyloxy groups such as acetoxy groups, propionoxy groups, butyloxy groups and benzoyloxy groups; alkenyloxy groups such as isopropenyloxy groups, isobutenyloxy groups and 1-ethyl-2-methylvinyloxy groups; iminoxy groups such as dimethylketoxime groups, methylethylketoxime groups, diethylketoxime groups, cyclopentanoxime groups and cyclohexanoxime groups; amino groups such as N-methylamino groups, N-ethylamino groups, N,N-dimethylamino groups and cyclohexylamino groups; amide groups such as N-methylacetamide, N-ethylacetamide and N-methylbenzamide; and aminooxy groups such as N,N-dimethylaminooxy groups and N,N-diethylaminooxy groups.

Furthermore in this constituent, in addition to the aforementioned hydrolyzable groups, examples of other monovalent hydrocarbon groups attached to silicon atoms include the same type of alkyl groups, alkenyl groups, aryl groups and aralkyl groups described above for the $R^3$ group.

In the present invention, specific examples of this type of organosilane which functions as a cross-linking agent include methyltrimethoxysilane, methyltriethoxysilane, vinyltrimethoxysilane, phenyltrimethoxysilane, vinyltriethoxysilane, tetraethoxysilane, tetra-n-propoxysilane, methyltris(propenoxy)silane, vinyltris(propenoxy)silane, (1-methoxy-2-methylpropenoxy)silane, as well as partially hydrolyzed condensates (namely, siloxane oligomers) of such compounds, and mixtures thereof.

Furthermore, specific examples of organosiloxanes (partially hydrolyzed condensates of the aforementioned silane compounds) which function as cross-linking agents include hexamethoxydisiloxane, hexaethoxydisiloxane, octamethoxytrisiloxane, octaethoxytrisiloxane, 1,3,5,7-tetramethoxy-1,3,5,7-tetramethylcyclotetrasiloxane and 1,3,5,7-tetraethoxy-1,3,5,7-tetramethylcyclotetrasiloxane.

The constituent (b) may be comprised of either a single compound, or a combination of two or more different compounds. Furthermore, the amount of this constituent (b) used should be between 0.5 and 20 parts by weight per 100 parts by weight of the organopolysiloxane of constituent (a), with quantities from 1 to 10 parts by weight being preferable. At quantities less than 0.5 parts by weight, the curing of the composition is unsatisfactory, and it becomes difficult to obtain a cured product with elastomer properties, and moreover the mechanical characteristics of the cured product may also deteriorate. In contrast, if quantities greater than 20 parts by weight are used, then other problems arise such as excessive hardness of the cured product.

[Constituent (c)]

In the present invention, the constituent (c) is an organic compound incorporating at least one sulfur atom in a single molecule, which upon addition to an organopolysiloxane composition produces superior mold release durability relative to unsaturated polyester resins.

However in some cases in which an organic compound comprising a sulfur atom is incorporated within a composition, there are occasions where the portion of the unsaturated polyester resin which contacts the surface of the silicone rubber mold suffers from very poor curing, and in such cases the uncured polyester resin constituent permeates into the silicone rubber mold and causes swelling of the rubber, particularly in pin shaped sections of the mold, resulting in a deterioration in the precision of the mold dimensions. The following compounds are excluded from use as the constituent (c), some of which to avoid the above-described problem.

Namely, sterically hindered thiobisphenols, substituted zinc dithiophosphates, sulfides represented by the formula: R—$S_q$—R' wherein R and R' are each a monovalent hydrocarbon group with at least three carbon atoms having or not having an ester bond or R and R' together form a ring and q is an integer of 1 to 3, compounds containing a sulfide structure represented by the formula: R—$S_q$—R" wherein R and q are as defined above, and R" is a bivalent hydrocarbon group having at least three carbon atoms and having or not having an ester bond, or R and R" together form a ring, said R" being connected to a quaternary carbon atom, and silicone polysulfides represented by a structural formula $S_a$—($R^1$—$Si(OR^2)_3)_2$ wherein $R^1$ represents a bivalent hydrocarbon group of 2 to 8 carbon atoms, each $R^2$ represents a monovalent hydrocarbon group of 1 to 40 carbon atoms, and a represents an integer from 2 to 7, are excluded from use as the constituent (c).

In the present invention, examples of the compounds which may be used as the constituent (c) include sulfides, thiol compounds, monothiocarboxylate esters, thiophene carboxylate esters and sulfur containing cyclic compounds.

Specific examples of sulfides include monosulfides such as diphenyl sulfide and allylphenyl sulfide; disulfides such as diphenyl disulfide, benzothiazoyl disulfide, tetraethylthiuram di sulfide and dimethyl xanthogen di sulfide; trisulfides such as diphenyl trisulfides; and dipentamethylenethiuram tetrasulfides. These sulfides should preferably comprise carbon, hydrogen and sulfur, and optionally oxygen.

Specific examples of thiol compounds include 2-mercaptonaphthalene, octadecane thiol and 2,2'-(ethylenedithio) diethane thiol.

Examples of monothiocarboxylate esters include thioglycolate esters and mercaptopropionate esters, with specific examples including octyl thioglycolate, dibutyl tin bisoctyl thioglycolate, dioctyl tin bisisooctyl thioglycolate, octyl-3-mercaptopropionate, dibutyl tin bisnonyl-3-mercaptopropionate, trimethylolpropane tristhioglycolate, pentaerythritol tetrakisthioglycolate and pentaerythritol tetrakisthiopropionate.

Examples of thiophene carboxylate esters include thiophene-2-carboxylate esters and thiophene-3-carboxylate esters, such as ethyl thiophene carboxylate.

An example of the suitable sulfur containing cyclic compound is 2-(4-morpholinyldithio)benzothiazol.

The aforementioned organic compound incorporating a sulfur atom may comprise a single compound, or a combination of two or more compounds.

The amount of this constituent (c) used should be between 0.1 and 20 parts by weight per 100 parts by weight of the organopolysiloxane of constituent (a), with quantities from 0.5 to 10 parts by weight being preferable. At quantities less than 0.1 parts by weight, the desired mold release durability relative to unsaturated polyester resins is not achieved. In contrast, if quantities greater than 20 parts by weight are used, there is a danger of other problems arising such as unsatisfactory curing of the unsaturated polyester resin at the interface with the cured product.

[Constituent (d)]

In the present invention, the constituent (d) is a curing catalyst used for promoting curing through cross-linking between the constituent (a) and the constituent (b), and utilizes a curing catalyst such as those typically used in condensation type room temperature curable silicone compositions.

Specific examples of such curing catalysts include metal salts of organic acids such as dibutyl tin dilaurate, dibutyl tin dibenzylmaleate, dibutyl tin dioctoate, dioctyl tin dilaurate, dioctyl tin diacetate, iron stearate and lead octoate, titanate esters such as tetraisopropyl titanate, and titanium chelate compounds such as titanium acetylacetonate, as well as mixtures of such compounds.

The amount of this type of curing catalyst used should be sufficient to provide a satisfactory catalytic effect, and typically is from 0.01 to 10 parts by weight per 100 parts by weight of the combined constituents (a) to (c), with quantities within a range from 0.1 to 5 parts by weight being desirable. At quantities less than 0.01 parts by weight, the catalytic function of the curing catalyst is not exhibited to a sufficient degree, and so the curing time lengthens, and there is a tendency for insufficient curing of the deeper portions of the rubber layer. In contrast, if quantities greater than 10 parts by weight are used, the shelf life of the composition deteriorates, and there is a tendency for other characteristics of the cured product, such as the heat resistance, to also deteriorate.

[Other Constituents]

In the present invention, in addition to the constituents (a) to (d) described above, various other additives may also be included in order to improve certain characteristics of the composition, provided such additives do not impair the effects of the present invention. Examples include reinforcing fillers and precipitation prevention agents such as fumed silica, precipitated silica, or hydrophobic products thereof, and carbon black, as well as non-reinforcing fillers and extenders such as quartz powder, fused quartz, spherical silica, diatomaceous earth, zeolite, calcium carbonate, titanium dioxide, iron oxide, alumina, spherical alumina, aluminum hydroxide, aluminum nitride, and magnesium sulfate. In addition, coloring agents such as inorganic pigments or organic dyes, or reagents for improving the heat resistance or flame resistance such as cerium oxide, zinc carbonate, manganese carbonate, benzotriazol or platinum compounds may also be added. Furthermore, because a composition of the present invention is a condensation curing type composition, water or alcohols such as methanol, ethanol, propanol, glycol, or methyl cellosolve may also be added in order to promote the curing process, and improve the curing of the deeper portions within the mold.

Furthermore in the present invention, unreactive organopolysiloxanes may also be added, and such unreactive organopolysiloxanes can be suitably used as internal mold release agents within the composition. This type of unreactive organopolysiloxane should preferably have a viscosity at 25° C. of 0.01 to 500 Pa·s.

EXAMPLES

As follows is a more detailed description of the present invention using a series of examples, although the present invention is in no way limited to the examples presented.

Examples 1 to 12, and Comparative Examples 1 to 3

As described below, room temperature curable organopolysiloxane compositions for molding purposes were prepared using each of the compositions A to C as a base, and then adding each of the compounds 1 to 8 in the proportions shown in Table 1 to Table 3. The mold durability was then evaluated for each composition, and these results are shown in Table 1 to Table 3.

(Base Composition A)

A mixture of 20 parts by weight of a α,ω-dihydroxypolydimethylsiloxane with a viscosity at 25° C. of 5 Pa·s, 20 parts by weight of a α,ω-bis(trimethylsiloxy)polydimethylsiloxane with a viscosity at 25° C. of 0.1 Pa·s, 12.5 parts by weight of hydrophobic silica with a specific surface area of 120 m²/g which had been treated with trimethylsilyl groups, 12.5 parts by weight of wet silica with a specific surface area of 200 m²/g, 2 parts by weight of hexamethyldisilazane, and 1 part by weight of water was placed in a kneader, and then mixed for 4 hours at a temperature of 160° C. Subsequently, 25 parts by weight of a α,ω-dihydroxypolydimethylsiloxane with a viscosity at 25° C. of 5 Pa·s, 1.5 parts by weight of a α,ω-dihydroxypolydimethylsiloxane with a viscosity at 25° C. of 0.02 Pa·s, 13.5 parts by weight of α,ω-bis(trimethylsiloxy)polydimethylsiloxane with a viscosity of 0.1 Pa·s, 5.0 parts by weight of powdered quartz with an average particle diameter of 5 μm, and 1.0 parts by weight of titanium dioxide were added to the mixture. To 100 parts by weight of the thus obtained mixture were added 1.0 part by weight of an ethyl polysilicate which represents a hydrolyzed condensate of tetraethoxysilane, and 0.2 parts by weight of tetrabutylbis(ethylmaleate)distanoxane, and following careful stirring, the mixture was degassed under vacuum to complete the production of the Base Composition A.

The Base Composition A was cured for 72 hours at 23° C. The thus obtained cured product displayed a Shore A hardness of 28, and a tear strength according to JIS K 6249 of 15 kN/m.

(Base Composition B)

A mixture of 17 parts by weight of a α,ω-dihydroxypolydimethylsiloxane with a viscosity at 25° C. of 5 Pa·s, 15 parts by weight of a α,ω-dihydroxypolydimethylsiloxane with a viscosity at 25° C. of 1.5 Pa·s, 1 part by weight of a α,ω-bis(trimethylsiloxy)polydimethylsiloxane with a viscosity at 25° C. of 0.03 Pa·s, 20 parts by weight of fumed silica with a specific surface area of approximately 200 m²/g as measured by BET methods, 5.0 parts by weight of hexamethyldisilazane, and 2.5 parts of water was placed in a kneader, and then kneaded for 4 hours at a temperature of 160° C. Subsequently, 18 parts by weight of α,ω-dihydroxypolydimethylsiloxane with a viscosity at 25° C. of 5 Pa·s, 14 parts by weight of a α,ω-bis(trimethylsiloxy)polydimethylsiloxane with a viscosity at 25° C. of 0.03 Pa·s, 3.0 parts by weight of a α,ω-dihydroxypolydimethylsiloxane with a viscosity at 25° C. of 0.02 Pa·s, and 5.0 parts by weight of powdered quartz with an average particle diameter of 5 μm were added to the mixture. To 100 parts by weight of the thus obtained mixture were added 2.5 parts by weight of tetra-n-propoxysilane, 0.5 parts by weight of phenyltrimethoxysilane, and 0.9 parts by weight of dioctyl tin dilaurate, and following careful stirring, the mixture was degassed under vacuum to complete the production of the Base Composition B.

The Base Composition B was cured for 72 hours at 23° C. The thus obtained cured product displayed a Shore A hardness of 34, and a tear strength according to JIS K 6249 of 15 kN/m.

(Composition C)

A mixture of 35 parts by weight of a α,ω-dihydroxypolydimethylsiloxane with a viscosity at 25° C. of 5 Pa·s, 20 parts by weight of fumed silica with a specific surface area of approximately 200 m²/g as measured by BET methods, 5.0 parts by weight of hexamethyldisilazane, and 2.5 parts by weight of water was placed in a kneader, and then kneaded for 4 hours at a temperature of 160° C. Subsequently, 15 parts by weight of a α,ω-dihydroxypolydimethylsiloxane with a viscosity at 25° C. of 5 Pa·s, and 15 parts by weight of a α,ω-bis(trimethylsiloxy)polydimethylsiloxane with a viscosity at 25° C. of 0.03 Pa·s were added to the mixture. To 100 parts by weight of the thus obtained mixture were added 5 parts by weight of a dimethylpolysiloxane in which both terminals of the molecular chain were blocked by a trimethylsilyl group and having a viscosity at 25° C. of approximately 100 Pa·s, 2.5 parts by weight of tetra-n-propoxysilane, and 0.6 parts by weight of dioctyl tin dilaurate, and following careful stirring, the mixture was degassed under vacuum to complete the production of the Base Composition C.

The Base Composition C was cured for 72 hours at 23° C. The thus obtained cured product displayed a Shore A hardness of 26, and a tear strength according to JIS K 6249 of 11 kN/m.

(Method of Evaluating Mold Durability)

To each of the aforementioned Base Compositions A, B and C as a base was added a compound selected from the various compounds 1 to 8 as described below in a proportion shown in Table 1 to generate a series of compositions incorporating an organic compound with a sulfur atom. Using each of the thus obtained compositions, and using as a master model a teflon cylinder with a diameter of 20 mm and a height of 20 mm with an aperture of a diameter of 4 mm and a depth of 12 mm in the center of the terminal surface of the cylinder, a matrix was prepared by curing the composition for 72 hours at 23° C. An unsaturated polyester resin TP-123 (manufactured by Dainippon Ink and Chemicals Inc.) was injected into each matrix, and the unsaturated polyester resin was then cured for one hour at 70° C. This molding operation was repeated until the rubber pin of the silicone matrix swelled and ruptured due to the effect of the unsaturated polyester resin, and the mold durability was evaluated based on the number of such molding operations performed before rupture.

(Compounds Incorporating a Sulfur Atom)

Compound 1

C[CH$_2$OOCCH$_2$CH$_2$S(CH$_2$)$_{11}$CH$_3$]$_4$

Compound 2

(C$_8$H$_{17}$)$_2$Sn(SCH$_2$COOC$_8$H$_{17}$)$_2$

Compound 3

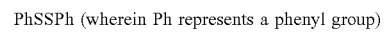
PhSSPh (wherein Ph represents a phenyl group)

Compound 4

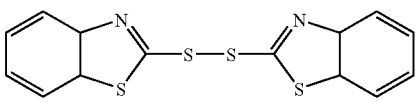

Compound 5

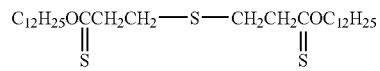

Compound 6

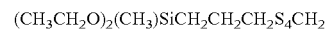
(CH$_3$CH$_2$O)$_2$(CH$_3$)SiCH$_2$CH$_2$CH$_2$S$_4$CH$_2$

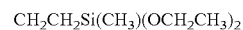
CH$_2$CH$_2$Si(CH$_3$)(OCH$_2$CH$_3$)$_2$

Compound 7

Compound 8

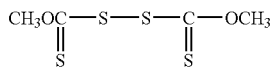

TABLE 1

Base: Base Composition A

| | Added compound | Quantity added (weight %) | Molding repetitions |
|---|---|---|---|
| Example 1 | Compound 1 | 2 | 70 |
| Example 2 | Compound 2 | 2 | 52 |
| Example 3 | Compound 3 | 1 | 46 |
| Example 4 | Compound 4 | 2 | 66 |
| Comparative example 1 | None | 0 | 23 |

TABLE 2

Base: Base Composition B

| | Added compound | Quantity added (weight %) | Molding repetitions |
|---|---|---|---|
| Example 5 | Compound 1 | 1 | 65 |
| Example 6 | Compound 2 | 1 | 45 |
| Example 7 | Compound 4 | 1 | 50 |
| Example 8 | Compound 5 | 2 | 73 |
| Comparative example 2 | None | 0 | 27 |

TABLE 3

Base: Base Composition C

| | Added compound | Quantity added (weight %) | Molding repetitions |
|---|---|---|---|
| Example 9 | Compound 5 | 1 | 60 |
| Example 10 | Compound 6 | 1 | 75 |
| Example 11 | Compound 7 | 1 | 47 |
| Example 12 | Compound 8 | 1 | 75 |
| Comparative example 3 | None | 0 | 25 |

Examples 13 to 14, and Comparative Examples 4 to 6

(Variations in Pin Length during Mold Durability Evaluations)

To the aforementioned Base Composition A was added or not added a compound selected from the compounds 1, 4, 9, and 10 as described above and below in the proportions shown in Table 4 to generate a series of compositions incorporating or not incorporating an organic compound with a sulfur atom. Using each of these compositions, and using as a master model a teflon cylinder of a diameter of 20 mm and a height of 20 mm with an aperture of a diameter of 4 mm and a depth of 12 mm in the middle of the cylinder, a matrix was prepared by curing the composition for 72 hours at 23° C. An unsaturated polyester resin TP-123 (manufactured by Dainippon Ink and Chemicals Inc.) was then injected into each matrix, and the unsaturated polyester resin was then cured for one hour at 70° C. This molding operation was repeated until the rubber pin of the silicone matrix was ruptured by the unsaturated polyester resin, and the number of such molding operations performed before rupture was counted, and the degree of swelling of the rubber pin was also evaluated by determining the degree of variation in the length of the pin. The results are shown in Table 4.

Compound 9

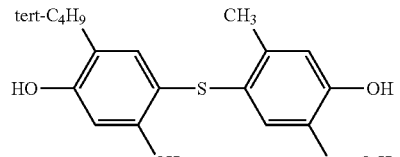

Compound 10

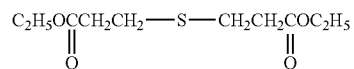

TABLE 4

Base: Base Composition A

| | Added compound | Quantity added (weight %) | Molding repetitions | Variation in pin length (%) |
|---|---|---|---|---|
| Example 13 | Compound 1 | 2 | 70 | +3 |
| Example 14 | Compound 4 | 2 | 66 | +7 |
| Comparative example 4 | None | 0 | 23 | +16 |
| Comparative example 5 | Compound 9 | 0.5 | 55 | +15 |
| Comparative example 6 | Compound 10 | 2 | 60 | +16 |

Although in the comparative example 5 and the comparative example 6, the addition of the compounds 9 and 10 respectively produced an improvement in the number of molding repetitions, the variation in the length of the rubber pin was large, indicating a deterioration in the precision of the mold dimensions.

What is claimed is:

1. A room temperature curable organopolysiloxane composition for molding purposes, comprising:
   (a) 100 parts by weight of an organopolysiloxane represented by a general formula (I):

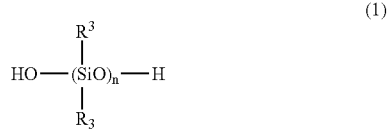

(1)

wherein, $R^3$ groups are identical or different and represent either one of an unsubstituted and a substituted monovalent hydrocarbon group, and n represents an integer of at least 2, (b) 0.5 to 20 parts by weight of a compound selected from a group consisting of organosilanes comprising at least three hydrolyzable groups bonded to silicon atoms within a single molecule, and organosiloxanes comprising at least three hydrolyzable groups bonded to silicon atoms within a single molecule, (c) 0.1 to 20 parts by weight of an at least one organic compound incorporating at least one sulfur atom in a single molecule, and which organic compound is at least one selected from the group consisting of diphenyl sulfide, allylphenyl sulfide, diphenyl disulfide, benzothiazoyl disulfide, dimethyl xanthogen disulfide, diphenyl trisulfides, 2-mercaptonaphthalene, 2,2'-(ethylenedithio)diethane thiol, monothiocarboxylate esters, thiophene carboxylate esters, 2-(4-morpholinyldithio) benzothiazol, a compound represented by the formula:

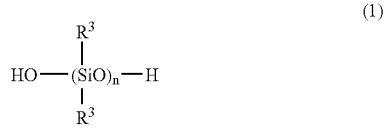
(1)

a compound represented by the formula:

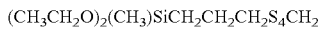

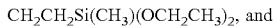, and a compound represented by the formula:

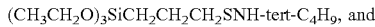, and (d) an effective quantity of a curing catalyst.

2. The composition according to claim 1, wherein in said general formula (1) representing said constituent (a), each $R^3$ represents, independently, any one of an alkyl group, an alkenyl group, a cycloalkyl group, an aryl group, an aralkyl group, and a halogen substituted alkyl group.

3. The composition according to claim 1, wherein in said general formula (1) representing said constituent (a), n represents an integer with an average value of 100 to 1000.

4. The composition according to claim 1, wherein said hydrolyzable groups of said constituent (b) are any one of alkoxy groups, acyloxy groups, alkenyloxy groups, iminoxy groups, amino groups, amide groups and aminooxy groups.

5. The composition according to claim 1, wherein said constituent (d) is any one of a metal salt of an organic acid, a titanate ester, a titanium chelate compound, and a mixture thereof.

6. The composition according to claim 1, wherein for 100 parts by weight of said constituent (a) there exist 1 to 10 parts by weight of said constituent (b), 0.5 to 10 parts by weight of said constituent (c), and 0.1 to 5 parts by weight of said constituent (d).

7. The composition according to claim 1, wherein said organic compound incorporating at least one sulfur atom of said constituent (c) is 2-mercaptonaphthalene, 2,2'-(ethylenedithio)diethane thiol, a thioglycolate ester, a mercaptopropionate ester, a thiophene carboxylate ester, or a combination of two or more compounds thereof.

8. The composition according to claim 7, wherein said organic compound incorporating at least one sulfur atom of said constituent (c) is 2-mercaptonaphthalene, 2,2'-(ethylenedithio)diethane thiol or a combination thereof.

9. The composition according to claim 7, wherein said organic compound incorporating at least one sulfur atom of said constituent (c) is a thioglycolate aster, and the thioglycolate ester is octyl thioglycolate, dibutyl tin bisoctyl thioglycolate, dioctyl tin bisisooctyl thioglycolate, trimethylolpropane tristhioglycolate, pentaerythritol tetrakisthioglycolate, or a combination of two or more thereof.

10. The composition according to claim 7, wherein said organic compound incorporating at least one sulfur atom of said constituent (c) is a mercaptopropionate ester, and the mercaptopropionate ester is octyl-3-mercaptopropionate, dibutyl tin bisnonyl-3-mercaptopropionate, pentaerythritol tetrakisdodecyl-3-mercaptopropionate, or a combination of two or more thereof.

11. The composition according to claim 7, wherein said organic compound incorporating at least one sulfur atom of said constituent (c) is a thiophene carboxylate ester, and the thiophene carboxylate ester is a thiophene-2-carboxylate ester, a thiophene-3-carboxylate ester, or a combination of two or more thereof.

12. The composition according to claim 1, wherein said organic compound incorporating at least one sulfur atom of said constituent (c) is a monothiocarboxylate ester, and the monothiocarboxylate ester is a thioglycolate ester, a mercaptopropionate ester, or a combination of two or more thereof.

* * * * *